United States Patent [19]

Ono

[11] Patent Number: 5,047,951
[45] Date of Patent: Sep. 10, 1991

[54] INFERENCE PROCESSOR USING META KNOWLEDGE

[75] Inventor: Kenji Ono, Fujisawa, Japan

[73] Assignee: Kabushiki Kaisha Toshiba, Kawasaki, Japan

[21] Appl. No.: 349,830

[22] Filed: May 10, 1989

[30] Foreign Application Priority Data

May 12, 1988 [JP] Japan ................................ 63-115341

[51] Int. Cl.$^5$ ............................................ G06F 15/00
[52] U.S. Cl. .................................................... 364/513
[58] Field of Search .......................................... 364/513

[56] References Cited

U.S. PATENT DOCUMENTS

| | | | |
|---|---|---|---|
| 4,704,695 | 11/1987 | Kimura et al. | 364/513 |
| 4,761,746 | 8/1988 | Tano et al. | 364/513 |
| 4,783,752 | 11/1988 | Kaplan | 364/513 |
| 4,847,784 | 7/1989 | Clancey | 364/513 |
| 4,849,905 | 7/1989 | Loeb et al. | 364/513 |
| 4,853,873 | 8/1989 | Tsuji et al. | 364/513 |
| 4,890,240 | 12/1989 | Loeb et al. | 364/513 |

FOREIGN PATENT DOCUMENTS 60-72031 4/1985 Japan.
62-19940 1/1987 Japan.

*Primary Examiner*—Allen R. MacDonald
*Attorney, Agent, or Firm*—Oblon, Spivak, McClelland, Maier & Neustadt

[57] ABSTRACT

An inference processor includes a production rule memory, a meta knowledge generator, a meta knowledge memory, a production system interpreter, and a working memory. The meta knowledge generator obtains production rules satisfying transition conditions between all the combinations of the states of the respective variables in the production rules as a directed-graph matrix. The meta knowledge generator then decomposes the directed-graph matrix into strongly connected components, and obtains, as meta knowledge, 1) variable-conditions of the respective strongly-connected components and 2) production rules satisfying transition conditions between the respective strongly-connected components. The interpreter generally determines an inference path from a given state to another state as a target on the basis of the meta knowledge, and efficiently executes production rules, thereby performing inference processing.

5 Claims, 7 Drawing Sheets

| PRODUCTION RULE | CONDITION (IF) PART | CONCLUSION (THEN) PART |
|---|---|---|
| R 1 | $y = a$ | $y = b$ |
| R 2 | $y = c$ | $y = b$ |
| R 3 | $y = b$ | $x = b$ |
| R 4 | $x = b \wedge y = a$ | $x = c \wedge y = c$ |
| R 5 | $x = c$ | $y = a$ |
| R 6 | $y = b$ | $y = c$ |
| R 7 | $x = a$ | $x = b$ |

| NODE | STATE |
|---|---|
| N 1 | $x = a \land y = a$ |
| N 2 | $x = a \land y = b$ |
| N 3 | $x = a \land y = c$ |
| N 4 | $x = b \land y = a$ |
| N 5 | $x = b \land y = b$ |
| N 6 | $x = b \land y = c$ |
| N 7 | $x = c \land y = a$ |
| N 8 | $x = c \land y = b$ |
| N 9 | $x = c \land y = c$ |

F I G. 4

| Nj\NK | N1 | N2 | N3 | N4 | N5 | N6 | N7 | N8 | N9 |
|---|---|---|---|---|---|---|---|---|---|
| N1 |  | R1 |  | R7 |  |  |  |  |  |
| N2 |  |  | R6 |  | R3, R7 |  |  |  |  |
| N3 |  | R2 |  |  |  | R7 |  |  |  |
| N4 |  |  |  |  | R1 |  |  |  | R4 |
| N5 |  |  |  |  | R3 | R6 |  |  |  |
| N6 |  |  |  |  | R2 |  |  |  |  |
| N7 |  |  |  |  |  |  |  | R5 | R1 |
| N8 |  |  |  |  | R3 |  |  | R5 | R6 |
| N9 |  |  |  |  |  |  | R5 | R2 |  |

FIG. 6

| Nj\NK | N1 | N2 | N3 | N4 | N9 | N8 | N7 | N5 | N6 | |
|---|---|---|---|---|---|---|---|---|---|---|
| N1 |  | R1 |  | R7 |  |  |  |  |  | I |
| N2 |  |  | R6 |  |  |  |  | R3, R7 |  | II |
| N3 |  | R2 |  |  |  |  |  |  | R7 | II |
| N4 |  |  |  |  | R4 |  |  | R1 |  | III |
| N9 |  |  |  |  |  | R2 | R5 |  |  | IV |
| N8 |  |  |  | R6 |  |  | R5 | R3 |  | IV |
| N7 |  |  |  |  |  | R1 | R5 |  |  | IV |
| N5 |  |  |  |  |  |  |  | R3 | R6 | V |
| N6 |  |  |  |  |  |  |  | R2 | R2 | V |

FIG. 7

| I | $x = a \wedge y = a$ |
|---|---|
| II | $(x = a \wedge y = b) \vee (x = a \wedge y = c)$<br>$\equiv x = a \wedge y \neq a$ |
| III | $x = b \wedge y = a$ |
| IV | $(x = c \wedge y = a) \vee (x = c \wedge y = b) \vee (x = c \wedge y = c)$<br>$\equiv x = c$ |
| V | $(x = b \wedge y = b) \vee (x = b \wedge y = c)$<br>$\equiv x = b \wedge y \neq a$ |

FIG. 8

|  | I | II | III | IV | V |
|---|---|---|---|---|---|
| I<br>$x = a \wedge y = a$ |  | R1 | R7 |  |  |
| II<br>$x = a \wedge y \neq a$ |  | R2,<br>R6 |  |  | R3,<br>R7 |
| III<br>$x = b \wedge y = a$ |  |  |  | R4 | R1 |
| IV<br>$x = c$ |  |  |  | R1, R2<br>R5, R6 | R3 |
| V<br>$x = b \wedge y \neq a$ |  |  |  |  | R2, R3<br>R6 |

FIG. 9

INFERENCE PROCESSOR USING META KNOWLEDGE

BACKGROUND OF THE INVENTION

1. Field of the Invention

The present invention relates to an inference processor for performing inference processing by executing production rules and, more particularly, to an inference processor designed to realize high-speed inference processing by choosing a production rule or rules which can be applicable in the next step beforehand in each step of the inference processing.

2. Description of the Related Art

In such a system for executing inference processing by using production rules, a single production rule having conditions matching data associated with a current state provided in inference processing and also matching a conclusion drawn in the course of inference is extracted from a large number of production rules. A final conclusion is drawn by using these rules. In order to realize high-speed inference processing, it is effective to extract a rule applicable in the next step at high speed in each step of inference processing.

Japanese Patent Disclosure (Kokai) Nos. 60-72031 and 62-19940 disclose conventional systems of quickly extracting such production rules. In these conventional systems, condition and conclusion parts of each production rule are checked so that relationships representing whether or not conclusions obtained by execution of which conclusion parts satisfies which conditions in the next step, i.e., relationships indicating application of which specific rule enables application of a specific rule in the next step are prepared as a table or a network. In inference processing, a rule applicable in the next step is sequentially selected by referring to these relationships, thus realizing highspeed inference processing.

In these systems, however, since only application relationships between rules are prepared, only the speed of processing for selecting a rule or rules applicable in the next step can be increased. If a plurality of rules are selected, it is impossible to know which is the optimal rule. Therefore, knowledge associated with a general direction of inference concerning, e.g., whether or not a certain state leads to a specific state, or which rule should be applied to draw a certain conclusion from a certain state, and with a global structure of a search graph cannot be obtained. For this reason, an unnecessary rule may be executed, and it is difficult to further increase the speed of inference processing.

SUMMARY OF THE INVENTION

As described above, in the conventional inference processors, since a general direction of inference is not clear, an unnecessary production rule may be executed, and a further increase in speed of inference processing is prevented.

The present invention has been made in consideration of such a problem, and has as its object to provide an inference processor which can determine a general direction of inference processing and efficiently execute production rules, thereby realizing high-speed inference processing.

An inference processor according to the present invention comprises a production rule memory for storing a plurality of production rules formed of pairs of condition and conclusion parts, a meta knowledge generator for obtaining a directed-graph matrix formed of production rules satisfying transition conditions between all combinations of states which are represented by variables included in the production rules stored in the production rule memory, decomposing the directedgraph matrix into strongly-connected components, and obtaining, as a mask knowledge, variable-conditions of respective strongly-connected components and production rules satisfying transition conditions between the respective strongly-connected components, and a production system interpreter for obtaining a general direction of interference on the basis of the meta knowledge obtained in the metal knowledge generator, and executing inference processing by extracting a production rule stored in the production rule memory on the basis of the direction.

According to the present invention, a general direction of inference can be determined from meta knowledge. An application order of the production rules for drawing a final conclusion is determined on the basis of this meta knowledge. The production rules are extracted in this order to execute inference processing. Therefore, execution of unnecessary production rules can be prevented, and the speed of inference processing can be further increased.

BRIEF DESCRIPTION OF THE DRAWINGS

FIG. 4 shows all combinations (nodes) of states which are represented by variables included in the production rules;

FIG. 6 shows a directed-graph matrix of FIG. 5;

FIG. 7 shows a matrix showing strongly-connected component decomposition of the directed-graph matrix of FIG. 6;

FIG. 8 shows a table of variable-conditions of the respective strongly-connected components;

FIG. 9 shows a directed-graph matrix showing transition conditions between the strongly-connected components.

DETAILED DESCRIPTION OF THE PREFERRED EMBODIMENTS

Figures 1, 2:
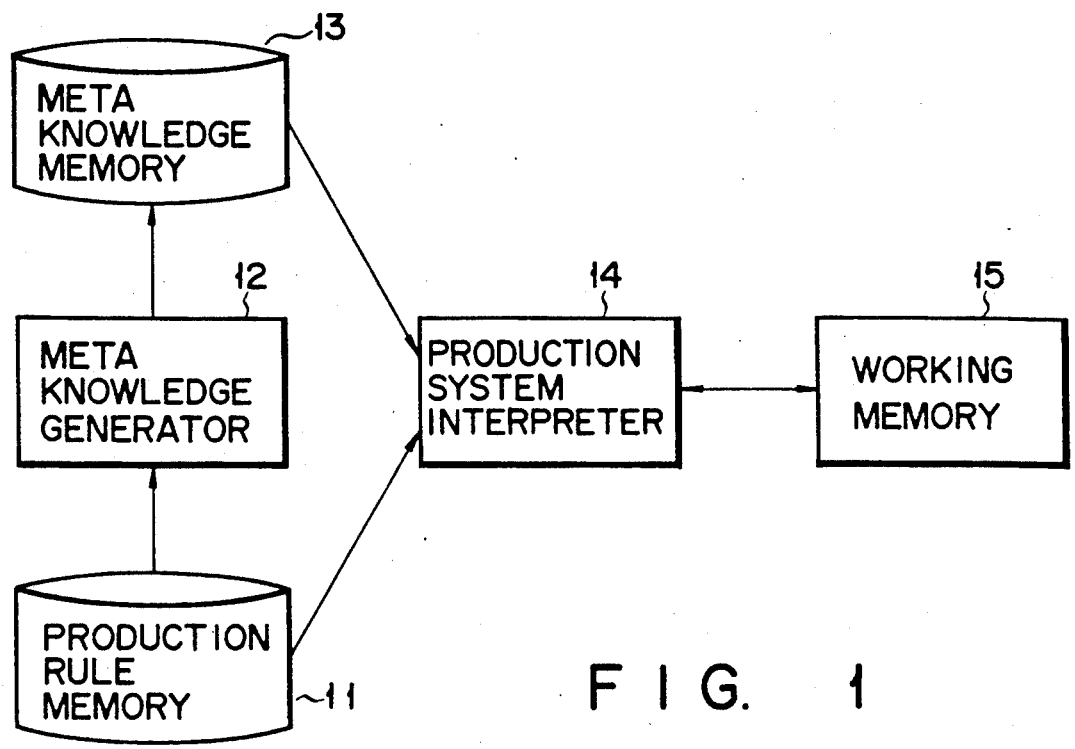
FIG. 1 is a block diagram showing an inference processor according to an embodiment of the present invention.
FIG. 2 shows the production rule.

An embodiment of the present invention will be described below with reference to the accompanying drawings. FIG. 1 is a block diagram showing an arrangement of an inference processor according to the embodiment of the present invention. This inference processor comprises a production rule memory 11, a meta knowledge generator 12, a meta knowledge memory 13, a production system interpreter 14, and a working memory 15.

The rule memory 11 stores a large number of production rules formed of pairs of condition and conclusion parts. The meta knowledge generator 12 extracts the production rules stored in the rule memory 11 prior to inference processing in the interpreter 14, and generates meta knowledge from them. More specifically, the meta knowledge generator 12 obtains production rules satisfying transition conditions between all the combinations of states which are represented by variables included in the production rules stored in the rule memory 11 as a directed-graph matrix, decomposes the directed-graph matrix into strongly-connected components, and obtains, as a meta knowledge, 1) variable-conditions of the respective strongly-connected components, 2) a partial order between the strongly-connected components, and 3) production rules satisfying transition conditions between the respective strongly-connected components. A sequence for calculating this meta knowledge will be described in detail later (FIG. 3).

The meta knowledge memory 13 stores the meta knowledge obtained by the meta knowledge generator 12. The interpreter 14 sequentially reads out the production rules stored in the rule memory 11 and executes inference processing. The interpreter 14 generally determines an inference procedure for leading a given state to another state as a target on the basis of the meta knowledge stored in the meta knowledge memory 13, and efficiently executes the production rules. The working memory 15 stores an initial state or an intermediate state in inference processing in the interpreter 14.

An operation of the embodiment having the above-described arrangement will be described below. Assume that seven production rules R1 to R7 shown in FIG. 2 are stored in the rule memory 11. The condition and conclusion parts are also called if and then parts, respectively. In this case, x and y represent variables; and a, b, and c, states. That is, a rule defines specific states which the variables x and y having certain states will take next. Note that a variable which is not defined in the condition part can take any state, and that the state of a variable which is not defined in the conclusion part is not changed. For example, the rule R1 states that if the variable y takes a state a, only the state of the variable y is changed to a state b regardless of the state of the variable x.

Figure 3:
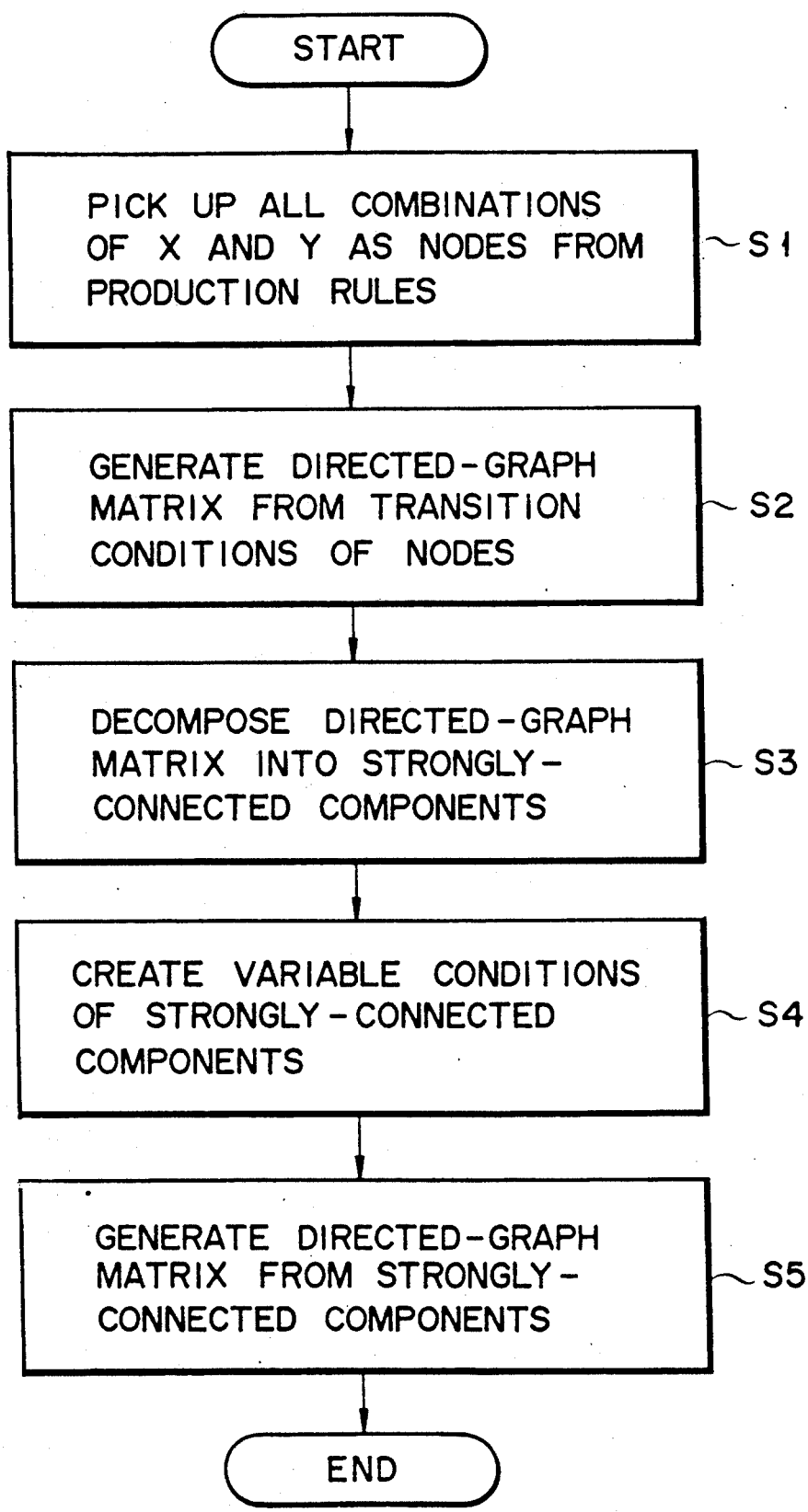
FIG. 3 is a flow chart showing a sequence of operations of a meta knowledge generator.

Prior to inference processing, the meta knowledge generator 12 generates meta knowledge from the production rules in accordance with a sequence shown in FIG. 3.

The meta knowledge generator 12 checks in step S1 the condition and conclusion parts of all the production rules stored in the rule memory 11, and obtains all the combinations of the states of the respective variables used in the rules as nodes. Regarding the rules R1 to R7 shown in FIG. 2, since the two variables x and y can take the three states a, b, and c, respectively, nine nodes can be obtained, as shown in FIG. 4. The total number of nodes is represented by n (in this case, nine).

Figure 5:
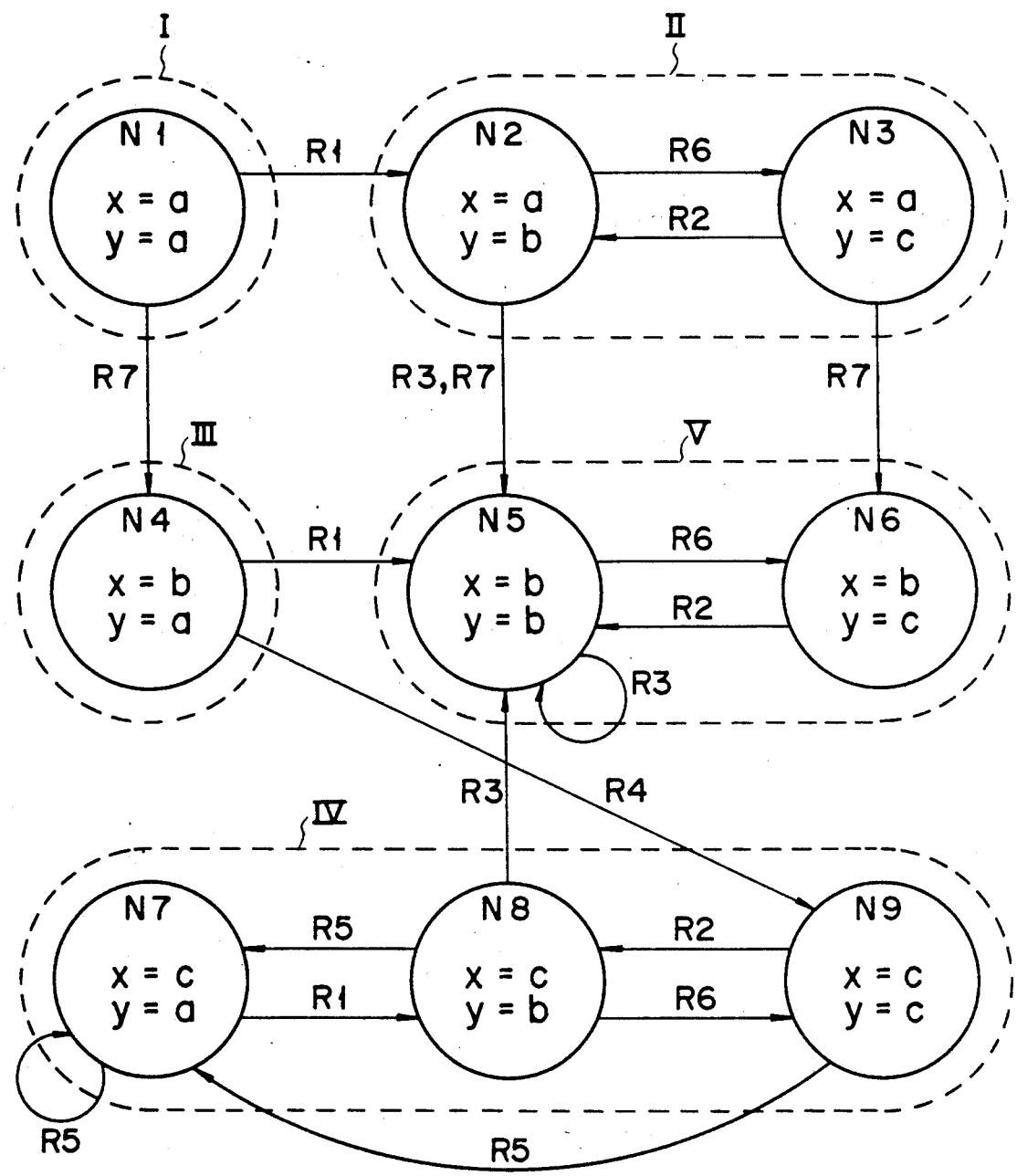
FIG. 5 shows a directed-graph representing the transition conditions between the nodes of FIG. 4.

In step S2, a directed-graph matrix is generated from transition conditions between nodes N1 to N9. If the nodes N1 to N9 shown in FIG. 4 are connected to each other by rules satisfying the transition conditions between the nodes, a directed-graph shown in FIG. 5 is obtained. If this graph is represented by a graph matrix, a directed-graph matrix shown in FIG. 6 is obtained. This matrix states rules Ri satisfies a transition condition from vertical nodes Nj to lateral nodes Nk. This matrix is obtained in practice in the following manner. A matrix (table) A having a size of n×n is prepared. When the states of the variables of the node Nj satisfy the condition part of the rule Ri, and the state of the variables of the node Nk are obtained as the execution result of the rule Ri, the rule Ri is registered in a (j,k) component of the matrix A.

In step S3, the directed-graph matrix of the nodes is decomposed into strongly-connected components. In this case, a strongly-connected component indicates a component constituted by nodes between which bidirectional transition can be performed. As shown in FIG. 5, the nodes N2 and N3; the nodes N5 and N6; and the nodes N7, N8, and N9 respectively constitute strongly-connected components. In addition, independent nodes are also regarded as strongly-connected components. In FIG. 5, portions enclosed with broken lines respectively indicate strongly-connected components. Upon decomposition, five strongly-connected components are extracted, which are respectively represented by numbers I to V. In this case, the total number of strongly-connected components is given as m. A simultaneous replacement method is known as a method of decomposing a directed-graph matrix into strongly-connected components. This method is also used in this case. According to this method, replacement of rows and columns is simultaneously performed so as to set all the lower left components to be zero, and square block matrices on the diagonal lines of the matrix are set to be strongly-connected components. In FIG. 6, the rows and columns of the nodes N5 and N8; N5 and N6; and N5 and N9 are sequentially replaced with each other to decompose the directed-graph matrix into strongly-connected components, thereby obtaining a matrix shown in FIG. 7.

In step S4, the logical OR of the states (shown in FIG. 4) of variables corresponding to each node included in the strongly-connected components I to V obtained as shown in FIG. 7 is calculated to obtain variable conditions corresponding to the strongly-connected components. The strongly-connected components I to V respectively include the node N1; the nodes N2 and N3; the node N4; the nodes N9, N8, and N7; and the nodes N5 and N6. The variable-conditions of the respective strongly-connected components are obtained as shown in FIG. 8. Note that simplified processing of the logical expressions can be performed by using a popular method for automatic design of a logical circuit and the like.

In step S5, a directed-graph matrix is obtained by using only production rules satisfying the transition conditions between the strongly-connected components. More specifically, a table B having a size of m×m is prepared. m is the total number of strongly-connected components. If a node a belongs to a strongly-connected component c, and a node b belongs to a strongly-connected component d, a rule registered in an (a,b) component of the strongly-connected component decomposition matrix shown in FIG. 7 is registered in a (c,d) component of the table B. This operation is performed with respect the respective components (j,k) of the strongly-connected component decomposition matrix shown in FIG. 7. As a result, a graph matrix shown in FIG. 9 is obtained. This graph matrix is stored in the meta knowledge memory 13 as meta knowledge. In other words, the meta knowledge represents 1) variable-conditions of the respective strongly-connected components and 2) production rules satisfying transition conditions between the respective strongly-connected components.

Figure 10:
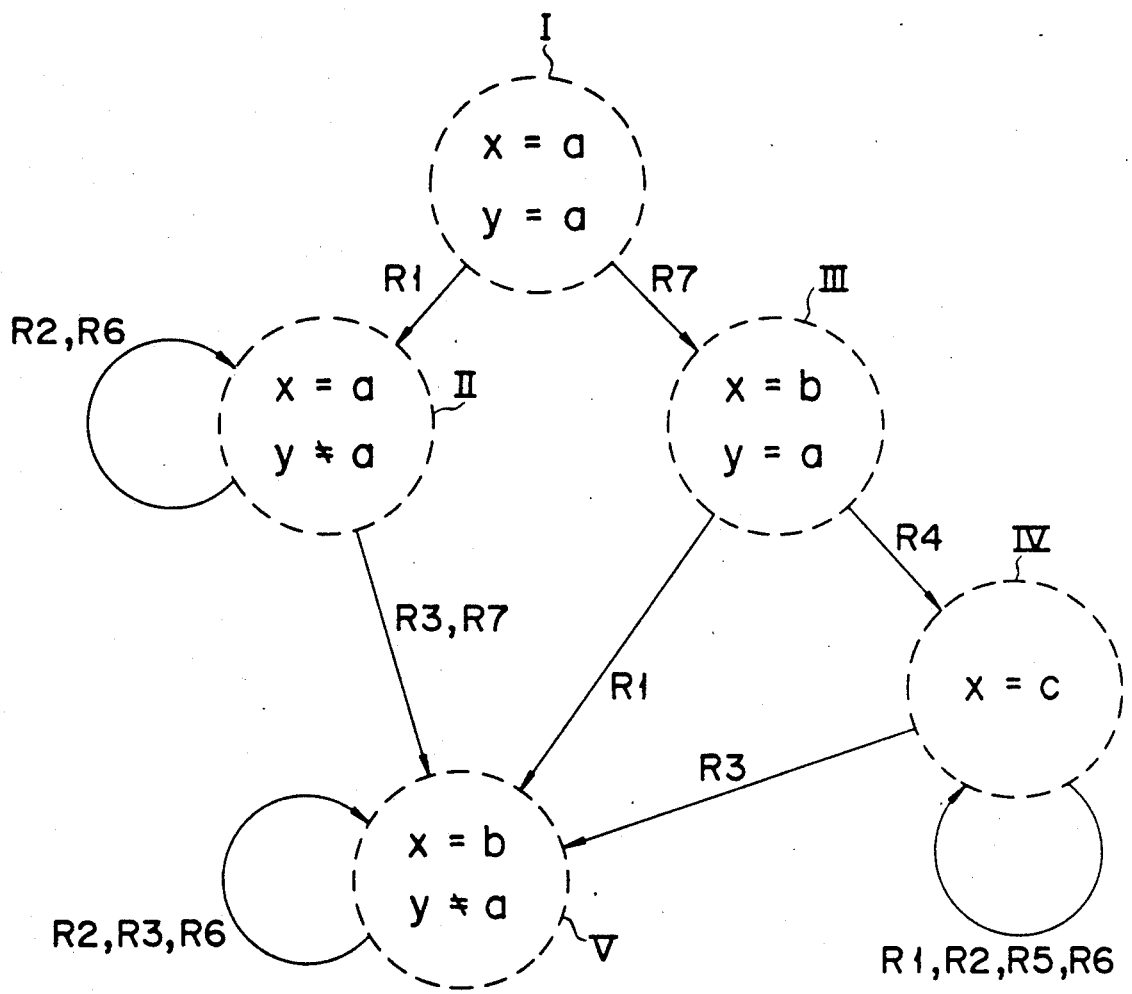
FIG. 10 shows a directed graph showing transition conditions between the strongly-connected components.

FIG. 10 shows an illustration based on the graph matrix of FIG. 9 obtained by the above-described processing. This graph matrix shows the transition conditions between the strongly-connected components. A general direction of inference processing can be determined from this matrix. Since this graph is considerably simplified compared with the graph shown in FIG. 5, this matrix can be stored in a memory as meta knowledge. If all the combinations of variables used in all the production rules shown in FIG. 5 are to be stored, a very large memory capacity is required. Hence, such an operation is not feasible in practice.

When meta knowledge is generated, inference is started. The interpreter 14 generally directs the inference on the basis of the meta knowledge in the course of the inference. The interpreter 14 sequentially extracts and executes the production rules in the rule memory 11, and stores results obtained in the course of the inference in the working memory 15.

Assume that as an example of inference, it is required to determine whether $x=c$ and $y=a$ can be obtained as an inference result from an initial state of $x=a$ and $y=a$.

Referring to the table of FIG. 9, it is found that the initial state of $x=a$ and $y=a$ is included in a strongly-connected component I, and the inference result of $x=c$ and $y=a$ is included in a strongly-connected component IV. The interpreter 14 searches a path leading from a strongly-connected component I to strongly-connected component IV. As a result, a path of I→III→IV is searched as a single available path. It is found that this result can be led from the initial state, though the order of execution of the production rule is unknown. Further, it is found that in order to reach the final target state from the initial state, one each of the rules R7 and R must be included in the rules to be sequentially applied, and the rule R4 must be executed after the execution of rule R7. Therefore, an optimal inference direction can be given as follows:

1) If the rule R7 can be applied, it must be immediately applied. Otherwise, other applicable rules are applied until the rule R7 becomes applicable while attention is paid not to allow transition to strongly-connected components other than the strongly-connected component I.

2) Similarly, if the rule R4 is applicable after the rule R7 is applied, the rule R4 is immediately applied. Otherwise, other applicable rules are applied until the rule R4 becomes applicable while attention is paid not to allow transition to strongly-connected components other than the strongly-connected component III.

3) After the rule R4 is applied, applicable rules are sequentially applied until the final target state is reached while attention is paid not to allow transition to components other than strongly-connected component IV.

In this embodiment, the rules R7 and R4 can be immediately applied in this order. After the execution of the rule R4, the rule R5 is the only rule which can be applied without causing transition to components other than strongly-connected component IV. If the rule R5 is executed in this case the target state can be reached. Therefore, it is determined that a series of rules R7, R4, and R5 can lead the initial state to the target state.

Further, the interpreter 14 can obtain general knowledge concerning a direction of inference that if the rule R1 is applied first, the target conclusion cannot be drawn, or that if the state corresponding to the strongly-connected component V is reached, transition to a state belonging to other strongly-connected components cannot be performed. This knowledge can be utilized for inference processing In the above embodiment, the interpreter 14 searches the path leading from the initial state to the inference result based on the directed-graph matrix shown in FIG. 9, thus it takes a considerably long time to search the path. The path can be searched faster if the partial order of the strongly-connected components is known. Therefore, it is desirable for the interpreter 14 to obtain the partial order of the strongly-connected components. The partial order represents that the transition direction between two adjacent strongly-connected components. In the case of FIG. 9, nine partial orders are obtained; I<II, I<III, II<II, II<V, III<IV, III<V, IV<IV, IV<V, V<V. For example, partial order I<II represents that the component I can be directly transited to component II. From the above partial orders, it is found that the component I can be transited to component V since there are orders of I<II and II<V. The interpreter 14 can check the possibility of inference path between the given components.

As has been described above, according to the present invention, since a general direction of inference can be determined by using meta knowledge, execution of unnecessary rules can be prevented, and high-speed inference processing can be realized.

What is claimed is:

1. An inference processor comprising:
   rule storage means for storing production rules formed of pairs of condition part and conclusion part;
   meta knowledge generating means for obtaining a directed-graph matrix formed of production rules satisfying transition conditions between all combinations of states of variables included in the production rules stored in said rule storage means, decomposing the directed-graph matrix into strongly-connected components, and obtaining conditions of variables of respective strongly-connected components and production rules satisfying transition conditions between the respective strongly-connected components as meta knowledge; and
   interpreter means for obtaining a general direction of inference on the basis of the meta knowledge obtained in said meta knowledge generating means, and executing inference processing by executing a production rule stored in said rule storage means on the basis of the direction.

2. The processor according to claim 1 in which said interpreter means receives an initial state and a certain state, determines whether or not there is a path leading from a strongly-connected component including the initial state to a strongly-connected component including the certain state by referring to the meta knowledge, and obtains a production rule or an execution order of the production rules when it is determined that there is the path.

3. The processor according to claim 2, in which if the obtained rule is applicable, said interpreter means immediately executes the rule, and if the rule is not applicable, other applicable rules are applied until the rule becomes applicable so that transition to other strongly-connected components from the strongly-connected component of interest does not occur.

4. The processor according to claim 1 in which said metal knowledge generating means comprises:
   means for storing a first matrix of $n \times n$ (n is a total number of the combinations);
   means for registering a production rule including a transition condition from a node i to node j in an (i,j) component of the first matrix, and registering zero in remaining components;

means for simultaneously replacing rows and columns of the first matrix such that zeros are set in a lower left portion of the first matrix and square block matrices are set on diagonal lines thereof;

means for obtaining a logical OR of states of variables of each node included in each strongly-connected component;

means for storing a second matrix of m×m (m is a total number of strongly-connected components); and means for registering a production rule including a transition condition from a strongly-connected component k to a strongly-connected component l in a (k,l) component of the second matrix, and registering zeros in remaining components.

5. The processor according to claim 1 in which said meta knowledge generating means comprises means for obtaining partial orders of the strongly-connected components as metal knowledge.

* * * * *